United States Patent
Koeninger et al.

(10) Patent No.: US 10,954,070 B1
(45) Date of Patent: Mar. 23, 2021

(54) CONVEYOR WITH A STANCHION FOR MOUNTING AN EQUIPMENT ON THE CONVEYOR

(71) Applicant: INTELLIGRATED HEADQUARTERS, LLC, Mason, OH (US)

(72) Inventors: Timothy A. Koeninger, Alexandria, KY (US); Eric Roth, West Chester, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 16/600,679

(22) Filed: Oct. 14, 2019

(51) Int. Cl.
  *B65G 21/10* (2006.01)
  *B65G 47/64* (2006.01)

(52) U.S. Cl.
  CPC .............. *B65G 21/10* (2013.01); *B65G 47/64* (2013.01)

(58) Field of Classification Search
  CPC ......... B65G 21/00; B65G 21/06; B65G 21/10
  USPC .......................................... 198/860.1, 861.1
  See application file for complete search history.

(56) References Cited

U.S. PATENT DOCUMENTS

| | | | | |
|---|---|---|---|---|
| 2,793,738 A * | 5/1957 | Erickson | ............... | B65G 21/06 198/860.1 |
| 3,075,622 A * | 1/1963 | Attwood | ............... | E04B 1/5818 403/245 |
| 3,944,054 A * | 3/1976 | Ensinger | ............... | B65G 21/06 198/860.3 |
| 5,421,451 A * | 6/1995 | Easton | ............... | B65G 21/06 198/860.1 |
| 5,682,977 A * | 11/1997 | White | ............... | B65G 21/2063 198/836.1 |
| 6,296,111 B1 * | 10/2001 | Mekanik | ............... | B65G 21/06 198/836.3 |
| 6,843,367 B1 * | 1/2005 | Gentile | ............... | B65G 51/03 198/861.1 |
| 8,763,793 B2 * | 7/2014 | Ertel | ............... | B65G 21/02 198/860.1 |
| 8,985,317 B2 * | 3/2015 | Martin | ............... | B65G 39/125 198/828 |
| 9,944,496 B2 * | 4/2018 | Matheisl | ............... | B66B 21/02 |
| 2005/0115809 A1 * | 6/2005 | Lutz | ............... | B65G 13/12 198/860.1 |

* cited by examiner

*Primary Examiner* — James R Bidwell
(74) *Attorney, Agent, or Firm* — Alston & Bird LLP

(57) ABSTRACT

A conveyor is described. The conveyor includes a conveyor frame that includes a slot defined on a first portion of the conveyor frame and a notch defined on a second portion of the conveyor frame. Further, the conveyor includes a stanchion configured to be mounted on the conveyor frame. In this regard, the stanchion comprises a hook adapted to pass through the slot of the conveyor frame and a surface that defines an aperture, the aperture adapted to enable a bolt to pass through the stanchion and insert into the notch in the second portion of the conveyor frame.

18 Claims, 11 Drawing Sheets

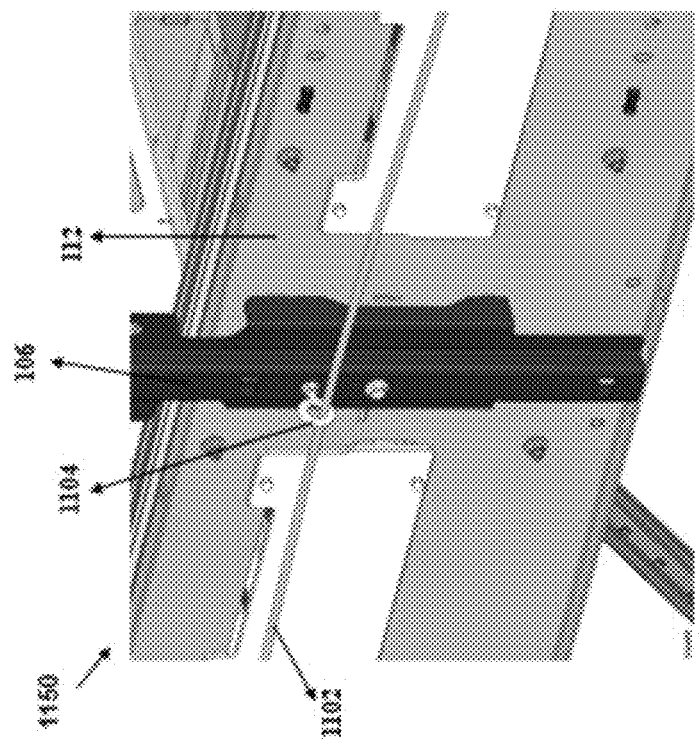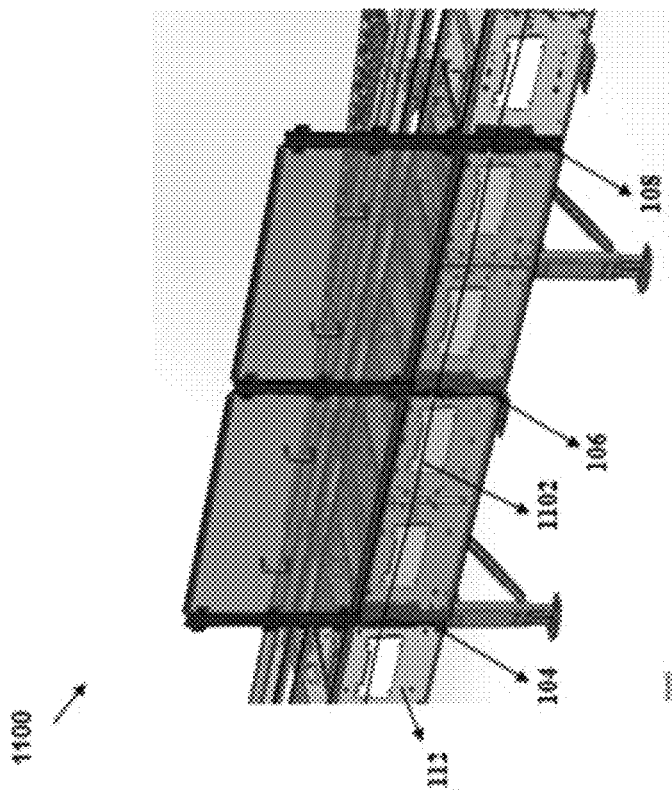
FIG. 11

CONVEYOR WITH A STANCHION FOR MOUNTING AN EQUIPMENT ON THE CONVEYOR

TECHNOLOGICAL FIELD

Example embodiments described herein relate generally to a conveyor comprising a stanchion for mounting equipment on the conveyor, and, more particularly, to a stanchion that can be mounted on a conveyor frame of the conveyor.

BACKGROUND

Generally, in material handling environments like, but not limited to, distribution centers, warehouses, inventories, or shipping centers, a material handling system, can convey, handle, sort, and organize various type of items (e.g. cartons, cases, containers, shipment boxes, totes, packages, and/or the like) at high speeds on a conveyor. In some examples, conveyors can include a roller conveyor bed, or a conveyor belt mounted between two sides of a conveyor frame. In some examples, the conveyor can correspond to a shoe sorter that can comprise, or rail guides mounted between the two sides of the conveyor frame. Typically, to mount various components and/or assembly (e.g., but not limited to, a safety panel, a drive pulley, a divert unit, etc.) the conveyor frame is designed to include one or more slots, apertures, and/or mounting members. To this end, mounting one or more components on the conveyor frame has associated challenges.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a conveyor. The conveyor can comprise a conveyor frame that includes a slot and a notch. In this regard, the slot can be defined on a first portion of the conveyor frame and the notch can be defined on a second portion of the conveyor frame. Further, the conveyor frame can comprise a stanchion that can be configured to be mounted on the conveyor frame. In some examples, the stanchion can comprise, a hook adapted to pass through the slot of the conveyor frame and a surface that can define an aperture. In this regard, the aperture on the surface can be adapted to enable a bolt to pass through the stanchion and insert into the notch in the second portion of the conveyor frame.

In some example embodiments, the stanchion can be configured to be fixedly mounted on the conveyor frame based on at least an engagement of the hook of the stanchion with the slot of the conveyor frame and fastening of the bolt through the stanchion engaged on the conveyor frame.

In some example embodiments, the second portion of the conveyor frame is a cross-bar that extends across a side of the conveyor frame.

According to some example embodiments, the bolt can be fastened through the stanchion engaged to the conveyor frame so that a distal end of the bolt abuts against a locking end defined by the notch.

In some example embodiments, the stanchion can comprise, a first portion that defines the hook. Further, the stanchion can comprise a second portion and a third portion defined between the first portion and the second portion. In some examples, the third portion is defined to protrude out from a plane defined by the first portion and the second portion and can comprise the surface that defines the aperture.

According to some example embodiments, the conveyor frame can comprise, a first slot, a second slot, a third slot, and a fourth slot. In this regard, in some examples, the stanchion can comprise, a first portion that defines a first hook and a second hook. To this end, the first hook and the second hook can be adapted to engage with the first slot and the second slot, respectively, of the conveyor frame. According to some example embodiments, the stanchion further can comprise, the second portion that defines a third hook and a fourth hook. In this regard, the third hook and the fourth hook can be adapted to engage with the third slot and the fourth slot respectively, of the conveyor frame.

According to some example embodiments, the stanchion can further comprise, an equipment mounting slot adapted to enable an engagement of a safety guard panel on the conveyor frame.

In some example embodiments, the stanchion can further comprise, an equipment mounting that can be adapted to enable an engagement of a divert unit of the conveyor on the conveyor frame. Some example embodiments described herein relate to a stanchion that can be configured to be mounted on a conveyor frame of a conveyor. The stanchion can comprise, a longitudinal post that can be defined between a first end and a second end. The longitudinal post can comprise, a first portion that can define a first hook and a second portion that can define a second hook. Further, the longitudinal post can comprise, a third portion that can be defined between the first portion and the second portion so that the third portion protrudes out from a plane defined by the first portion and the second portion. Furthermore, in some examples, the third portion can define an aperture adapted to enable a bolt to pass through from the aperture and insert into a member of the conveyor frame, thereby, engaging the stanchion on the conveyor frame.

According to some example embodiments, a shape of the first hook and the second hook of the stanchion can complement to a shape of a first slot and a second slot of the conveyor frame, thereby supporting an engagement of the first hook into the first slot and an engagement of the second hook into the second slot of the conveyor frame.

In an example embodiment, the stanchion can further comprise, an equipment mounting slot that can be adapted to enable an engagement of a safety guard panel on the conveyor frame.

In another example embodiment, the stanchion can further comprise, an equipment mounting slot that can be adapted to enable an engagement of a divert unit of the conveyor on the conveyor frame.

According to some example embodiments, the stanchion can be configured to be fixedly mounted on the conveyor frame based on at least: an engagement of the first hook into a first slot of the conveyor frame, an engagement of the second hook into a second slot of the conveyor frame and fastening of the bolt through the stanchion engaged on the conveyor frame.

In some example embodiments, the bolt can be fastened through the stanchion engaged to the conveyor frame so that a distal end of the bolt abuts against a locking end defined by the member of the conveyor frame.

Some example embodiments described herein relate to a stanchion for mounting equipment on a conveyor frame. The stanchion can comprise, a first portion that can comprise a hook adapted to pass through a slot of the conveyor frame, thereby engaging the stanchion on the conveyor frame. Further, the stanchion can comprise a protruded portion that can define an aperture adapted to enable a bolt to pass through the aperture and abut with a member of the conveyor frame, thereby fixedly mounting the stanchion with the conveyor frame.

In some example embodiments, the stanchion can further comprise, the first portion that defines the first hook and a second hook. In this regard, in some examples, the first hook and the second hook can be adapted to engage with a first slot and a second slot of the conveyor frame. Further, the stanchion can comprise, a second portion that defines a third hook and a fourth hook. In this regard, the third hook and the fourth hook can be adapted to engage with a third slot and a fourth slot of the conveyor frame.

According to some example embodiments, the protruded portion of the stanchion can be defined between the first portion and the second portion of the stanchion. In this regard, in some examples, the protruded portion of the stanchion protrudes out relative to a plane defined by the first portion and the second portion of the stanchion.

According to some example embodiments, at least one of the first portion and the second portion further defines, an equipment mounting slot adapted to enable an engagement of a safety guard panel on the conveyor frame.

According to some example embodiments, the stanchion can be configured to be fixedly mounted on the conveyor frame based on at least, an engagement of the hook with the slot of the conveyor frame and fastening of the bolt so that the bolt may pass through the stanchion and abut at a notch defined at the conveyor frame.

In some example embodiments, the stanchion can further comprise, an equipment mounting adapted to enable an engagement of a divert unit of the conveyor on the conveyor frame.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 11 is another example scenario illustrating a first view representing a pull cord mounted on the plurality of stanchions of the conveyor and a second view representing an engagement of the pull cord on a hook mounted on a stanchion of the plurality of stanchions, in accordance with some example embodiments described herein

DETAILED DESCRIPTION

Figure 1:
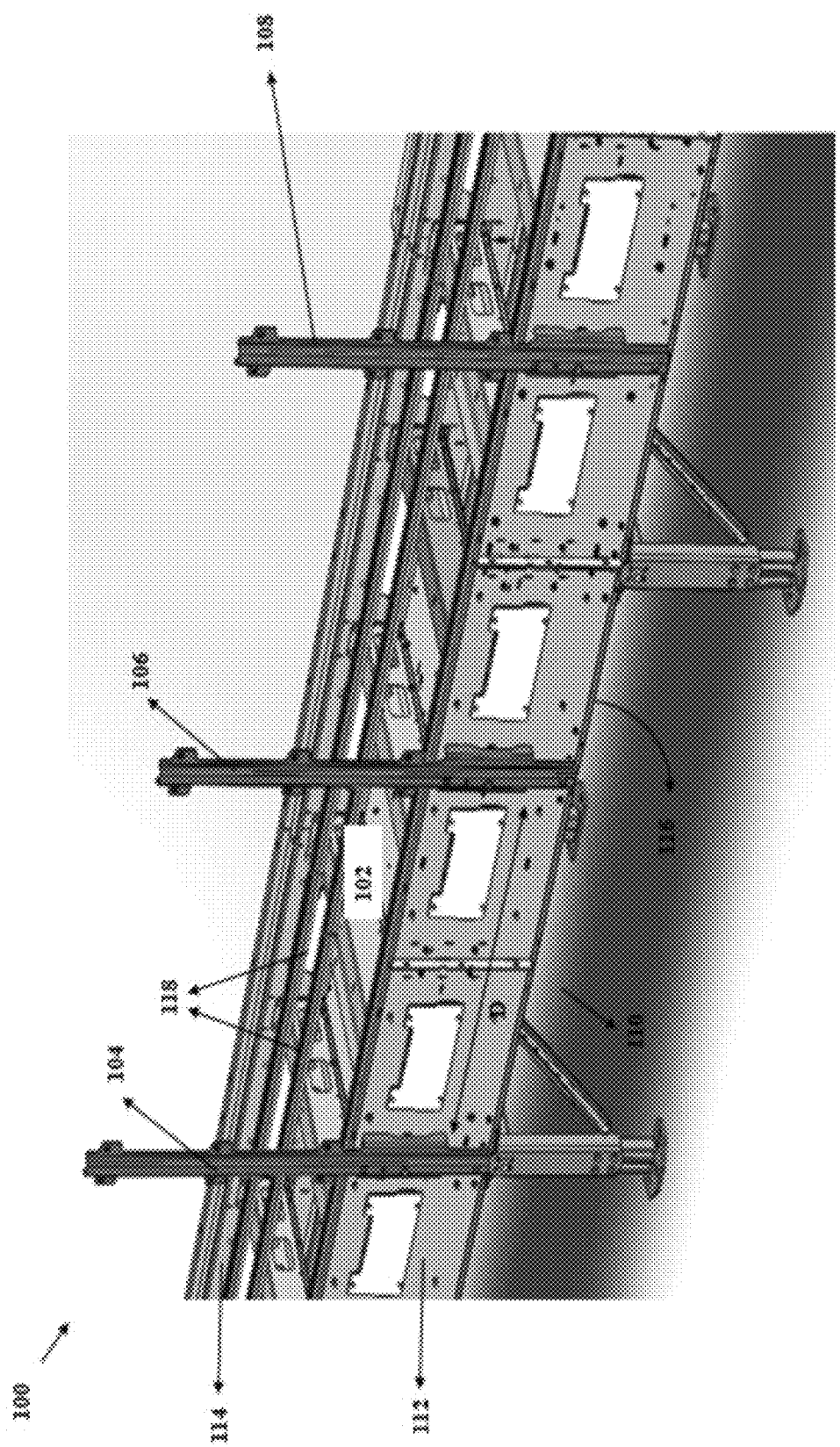
FIG. 1 illustrates a perspective view of a conveyor comprising a stanchion, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

In material handling environment (e.g. distribution centers, warehouses, inventories, shipment centers, and/or the like) that includes one or more conveyors, it is often desired to mount various components (e.g., but not limited to, take-away spurs, safety guards, panels, covers, chutes, safety pullcord guides, and other equipment) alongside on the conveyors (e.g. on base frame of the conveyor). Existing mechanisms for mounting such components on the conveyors are based on extensive pre-engineering or re-designing of the conveyor frames. For instances, in some examples, the conveyor frames are pre-casted to have one or more slots and support features defined on the surface of the conveyor frames that can support mounting of such components to the conveyor frame. However, designing such conveyor frames has associated challenges and also adds to cost of overall manufacturing of a conveyor base. Also, such conveyor frames may not be utilized for reuse, i.e. to mount a component with a different geometry, shape, or utility.

Various example embodiments described herein relates to, techniques for mounting such components on the conveyor in a manner that enables: (a) such components to be mounted on the conveyor at a reduced cost and (b) future add-on components to be developed and mounted on the conveyor without requiring significant changes to existing components or existing design of the conveyor frames.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

FIG. 1 illustrates a perspective view 100 of a conveyor 102 of a material handling environment. The conveyor 102 comprises, a conveyor base and a plurality of stanchions, for instance, a first stanchion 104, a second stanchion 106, and a third stanchion 108 mounted on the conveyor base. Illustratively, the conveyor base includes a conveyor frame 110 defined by at least, a first side frame 112, a second side frame 112, and a base frame 114.

According to some example embodiments, the conveyor 102 corresponds to a sortation system (e.g. a shoe sorter) that can comprise guide rails 118 on which a divert unit (not shown) can be mounted. In this regard, in some example embodiments, the conveyor 102 can correspond to a sortation conveyor with pusher shoes (not shown) mounted on one of the guide rails 118. Accordingly, in some examples, the conveyor 102 can correspond to the sortation conveyor comprising components that can operate based on some techniques as described in U.S. patent application no U.S. Ser. No. 12/014,922, entitled, "Sortation Conveyor", filed 16 Jan. 2008 and/or U.S. patent application no U.S. Ser. No. 15/147,475, entitled, "High-speed, dual-sided shoe sorter with offset induct", filed 5 May 2016, details of which are incorporated herein by reference.

Alternatively, in some example embodiments, the conveyor 102 can correspond to a roller bed conveyor. In this regard, the roller bed conveyor can include a conveying surface for conveying items that can be defined by a plurality of motor driven or non-motor driven rollers mounted between the first side frame 112 and the second side frame 114 of the conveyor frame 110. Alternatively, in some example embodiments, the conveyor 102 can correspond to a belt conveyor comprising a plurality of conveyor belts mounted between the first side frame 112 and the second side frame 112 of the conveyor frame 110. It may be understood, that mounting of the stanchions described hereinafter in accordance with various example embodiments, is not limited to sortation conveyors or roller bed conveyors, rather, in accordance with some example embodiments, the stanchions can be installed on conveyors of any type and/or on components in a material handling environment, for example, singulator conveyors, accumulators, and/or the like.

In accordance with various example embodiments described herein, the plurality of stanchions, i.e. the first stanchion 104, the second stanchion 104, the third stanchion 106, can be mounted on the conveyor frame 110 at pre-defined distances between each other depending on a utility (e.g., but not limited to, a size of an equipment to be mounted on the conveyor 102). For instance, as illustrated, the first stanchion 104 and the second stanchion 106 can be mounted on the conveyor 102 a defined distance D from each other. To this end, in some examples, a security panel (i.e. a window that guards and prevents access to the conveyor 102 in operation) can be mounted between the two stanchions (e.g. the first stanchion 104 and the second stanchion 106) installed on the conveyor frame 110. Further examples of mounting an equipment on the stanchion are described in reference to FIG. 6.

Although, FIG. 1 illustrates the stanchions (104, 106, and 108) mounted on one side frame (i.e. the first side frame 112) of the conveyor frame 110, however, in some other example embodiments, similar stanchions can be mounted on the other side of the conveyor frame 110, i.e. the second side frame 114 also. Said differently, in some example embodiments, the conveyor 102 can comprise multiple stanchions mounted on both sides, i.e. on the first side frame 112 and the second side frame 114 of the conveyor frame 110.

Figure 2:
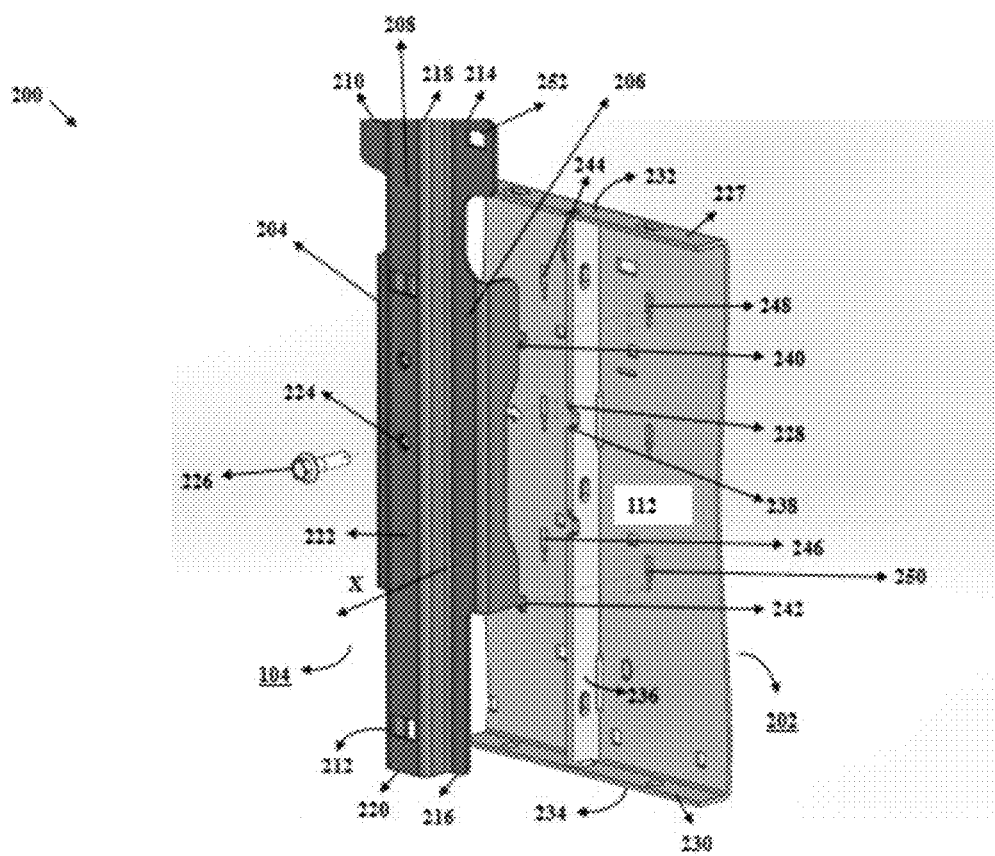
FIG. 2 illustrates an exploded view of the stanchion and a conveyor frame of the conveyor, in accordance with some example embodiments described herein.

FIG. 2 illustrates an exploded view 200 of the stanchion 104 and a section 202 of the conveyor frame 110 of the conveyor 102, in accordance with some example embodiments described herein. Illustratively, the stanchion 104 can be of a shape like a longitudinal post, a molded piece of metal sheet, and/or the like, that can comprise three portions, e.g. a first portion 204, a second portion 206, and a third portion 208. In this regard, in some examples, the first portion 204 can be defined between a first end 210 and a second end 212. Similarly, the second portion 206 can be defined between a third end 214 and a fourth end 216 of the stanchion 104. Further, the third portion 208 can be defined between a fifth end 218 and a sixth end 220 of the stanchion 104. As illustrated, the third portion 208 can be defined so as to protrude out in a direction X from a plane defined by the first portion 204 and the second portion 206 of the stanchion 104. For the purpose of brevity, the third portion 208 of the stanchion 110 can be interchangeably referred hereinafter, as a protruded portion at some places in this description.

In accordance with some example embodiments described herein, the stanchion 104 can define one or more hooks. In this aspect, the hooks of the stanchion 104 can be adapted to engage with respective slots defined on the conveyor frame 110. To this end, an engagement of a hook of the stanchion 104 on a slot of the conveyor frame 110 engages the stanchion 104 to the conveyor frame 110. For instance, according to some example embodiments, the first portion 204 of the stanchion 104 can define a first hook (not shown) and a second hook (not shown). Further, the second portion 206 of the stanchion 104 can define a third hook 240 and a fourth hook 242. In this regard, according to the example embodiments, a shape of the first hook the second hook, the third hook 240, and the fourth hook 242 of the stanchion 104 can be such that, it complements to a shape of respective slots on the conveyor frame 110. Furthermore, according to some example embodiments, a surface 222 of the third portion 208 of the stanchion 104 can define at least one aperture 224. In this regard, the aperture 224 can be adapted to enable a bolt 226 to pass through the stanchion 104. To this end, in some examples, the bolt 226 when passed through the aperture 224 can threads into the stanchion 104. In some examples, the bolt 226 when passed through the aperture 224 can insert into a notch 228 defined on the section 202 of the conveyor frame 110, thereby fixedly mounting the stanchion 104 on the conveyor frame 110.

Figure 3:
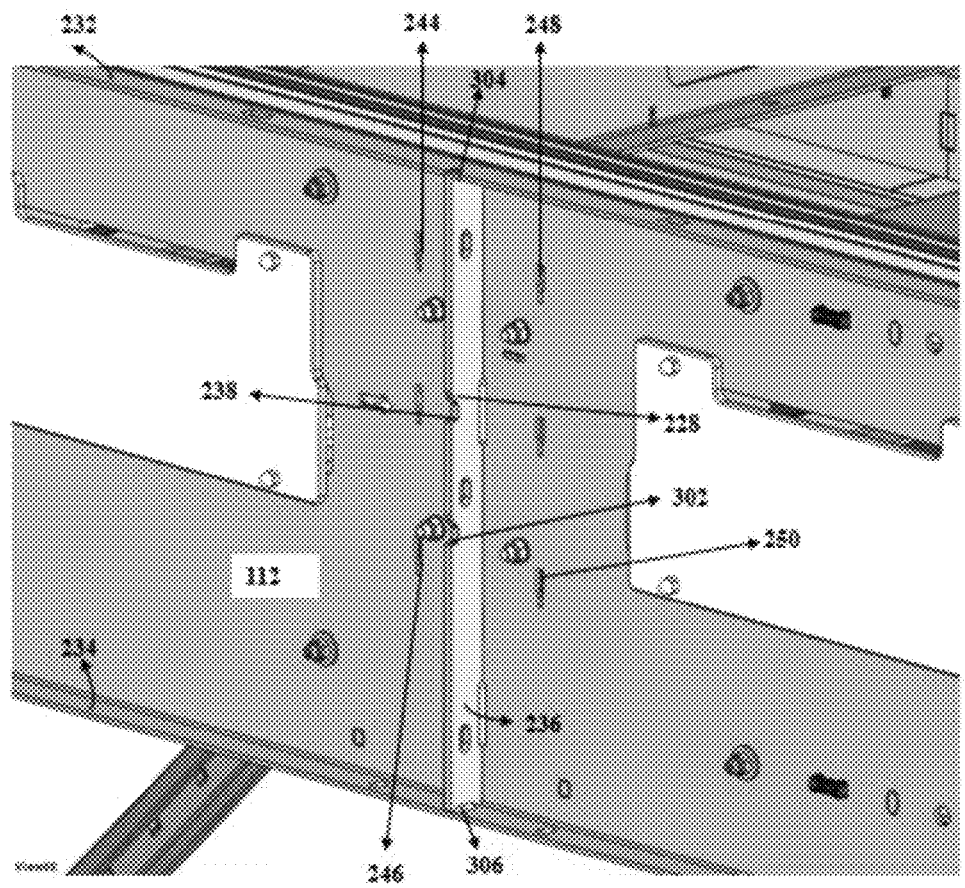
FIG. 3 illustrates a perspective view of a section of the conveyor frame of the conveyor, in accordance with some example embodiments described herein.

Referring to FIGS. 2 and 3, the section 202 of the conveyor frame 110 on which the stanchion 104 can be mounted, is illustrated. According to some example embodiments, the section 202 of the conveyor frame 110 can correspond to a portion of the first side frame 112 of the conveyor frame 110 (as illustrated and described in FIG. 1). Illustratively, the section 202 of the conveyor frame 110 can be defined between a top end 227 and a bottom end 230 of the first side frame 112. In some example embodiments, the section 202 of the first side frame 112 can comprise: (i) a wall surface of the first side frame 112, (ii) a first member 232 and a second member 234 that extends out from the top end 227 and the bottom end 230 of the wall surface of the first side frame 112, and (iii) a cross-bar member 236. As illustrated, the cross-bar member 236 can be mounted between ends 304 and 306 of the first member 232 and the second member 234 respectively and extends out at a defined angle relative to the wall surface of the first side frame 112. Further, the cross-bar member 236 of the first side frame 112 can define at least one notch 228 comprising a locking end 238.

As illustrated in FIGS. 2 and 3, the section 202 of the conveyor frame 110 can define a first slot 244, a second slot 246, a third slot 248, and a fourth slot 250, respectively. In this regard, according to some examples, a shape of, the first hook the second hook, the third hook 240, and the fourth hook 242 of the stanchion 104 complements to a shape of the first slot 244, the second slot 246, the third slot 248, and the fourth slot 250 respectively. Said differently, the first slot 244, the second slot 246, the third slot 248, and the fourth slot 250 of the conveyor frame 110 can be defined so as to enable passing through of the first hook, the second hook, the third hook 240, and the fourth hook 242 into the respective slots, thereby supporting an engagement of hooks of the stanchion 104 into respective slots on the conveyor frame 110.

In some example embodiments, to engage the stanchion 104 over the section 202 of the conveyor frame 110, the stanchion 104 can be positioned over the section 202 of the conveyor frame 110 so that, the third portion 208 (i.e. protruded portion) defined by the stanchion 104 can be positioned over the cross-bar member 236 of the conveyor frame 110. In this regard, the stanchion 104 can be positioned over the section 202 so that the first hook can be inserted into the first slot 244, the second hook can be inserted into the second slot 246, the third hook 240 can be inserted into the third slot 248, and the fourth hook 242 can be inserted into the fourth slot 250.

Figure 4:
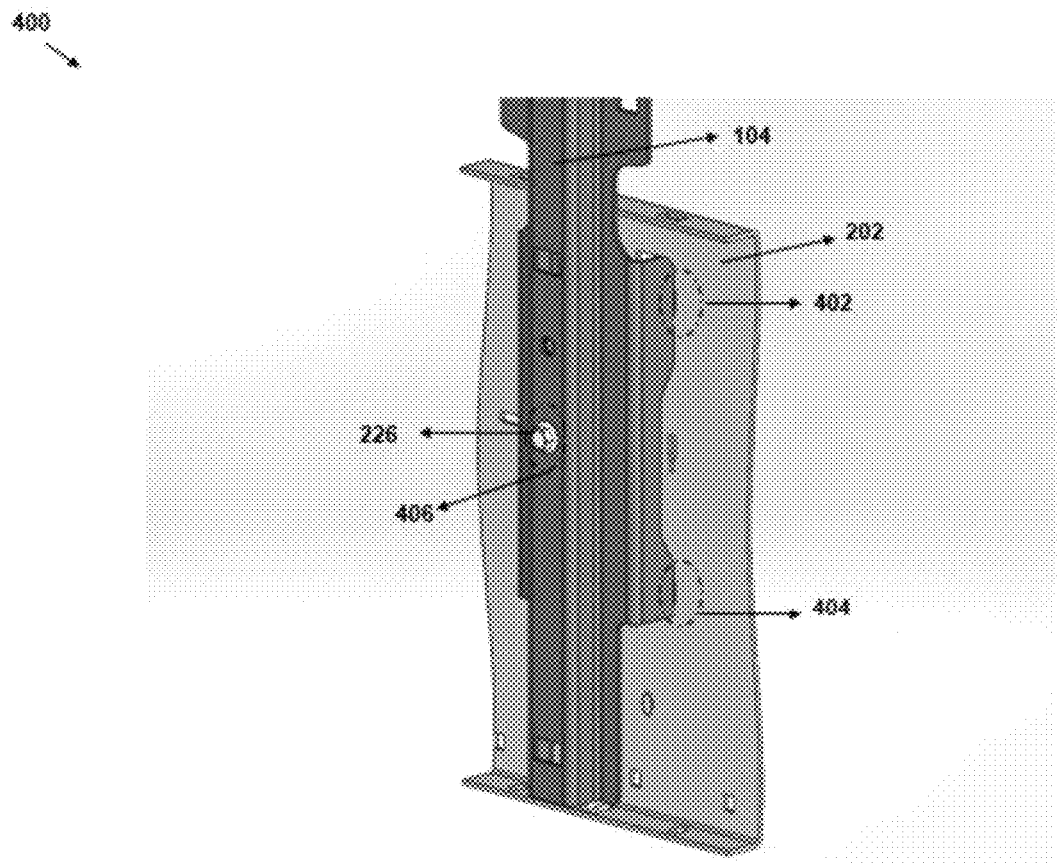
FIG. 4 illustrates a perspective view of the stanchion mounted on the conveyor frame, in accordance with some example embodiments described herein.

FIG. 4 illustrates a perspective view 400 that represents the stanchion 104 mounted on section 202 of the conveyor frame 110, in accordance with some example embodiments described herein. In some examples, the stanchion 104 can be configured to be fixedly mounted on section 202 of the conveyor frame 110, thereby supporting mounting of additional equipment on the conveyor 102. According to some example embodiments, the stanchion 104 can be mounted on section 202 based on at least, (i) an engagement of a hook of the stanchion 104 with a slot of the conveyor frame 110 and (ii) fastening of the bolt 226 through the stanchion 104 engaged on the conveyor frame 110. In this regard, in some example embodiments, as described in FIG. 3, the stanchion 104 can be positioned over the section 202 of the conveyor frame 110 such that, one or more hooks of the stanchion 104 can slidably move into respective slots defined on section 202 of the conveyor frame 110. For example, FIG. 4 illustrates, a first section 402 representing an engagement of the third hook 240 of the stanchion 104 into the third slot 248, a second section 404 representing another engagement of the fourth hook 242 of the stanchion 104 into the fourth slot 250, and a third section 404 representing another engagement of the bolt 226 into the aperture 224 of the stanchion 104. Further details of mounting of the stanchion 104 on the conveyor frame 110 are described in reference to FIG. 5

Figure 5:
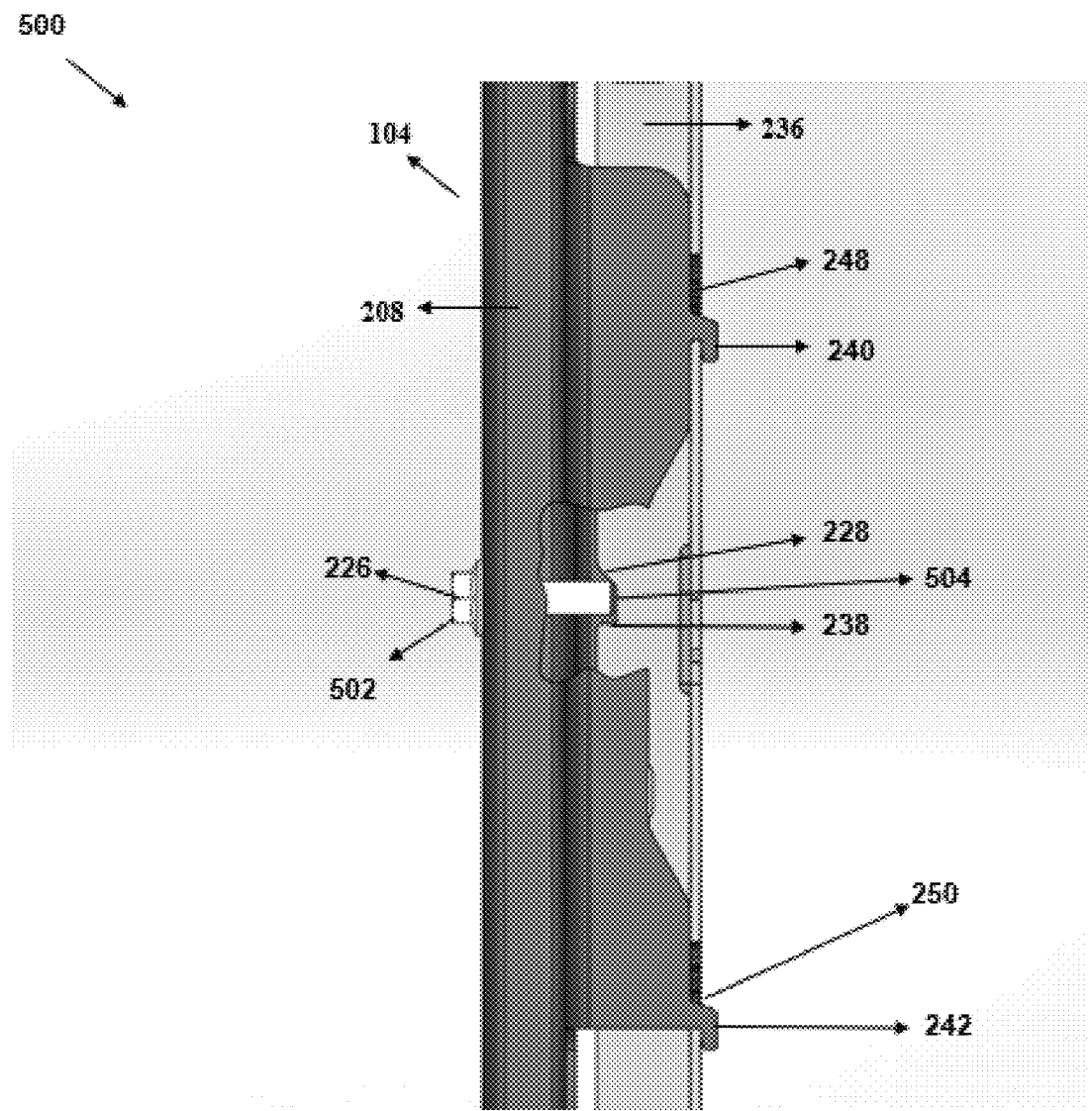
FIG. 5 illustrates a side perspective view depicting the mounting of the stanchion on the conveyor frame, in accordance with some example embodiments described herein.

FIG. 5 illustrates a side perspective view 500 depicting the stanchion 104 mounted on the section 202 of the conveyor frame 110, in accordance with some example embodiments described herein. As said before, in accordance with some example embodiments described herein, the stanchion 104 can be fixedly mounted on the conveyor frame 110 based on at least: (i) an engagement of at least one hook of the stanchion 104 into a respective slot of the conveyor frame 110 and (ii) fastening of the bolt 226 through the stanchion 104 engaged on the conveyor frame 110. For instance, the side perspective view 500 illustrates, an engagement of: (a) the third hook 240 of the stanchion 104 into the third slot 248 of the conveyor frame 110 and (b) the fourth hook 242 of the stanchion 104 into the fourth slot 250 of the conveyor frame 110.

As described before in reference to FIG. 2, the stanchion 104 defines the aperture 224 that can be adapted to enable the bolt 226 to pass through the stanchion 104 and abut with the cross-bar member 236 of the conveyor frame 110. In some examples, the bolt 226 can thread into the stanchion 104 as the bolt 226 is passed through the aperture 224. Having said that, the side perspective view 500 also illustrates, the bolt 226 fastened over the stanchion 110. In this regard, according to some examples, the bolt 226 can be passed through the aperture 224 of the stanchion 104 and can be fastened over the stanchion 104, so that: (a) a crown defined by a proximal end 502 of the bolt 226 abuts to the surface 222 of the stanchion 110 and (b) a distal end 504 of the bolt 226 can be received into the notch 228 of the cross-bar member 236. Fastening the bolt 226 over the stanchion 104 can cause the distal end 504 of the bolt 226 to slidably move within a cavity defined by the notch 228. To this end, in some examples, the bolt 226 can be fastened over the stanchion 119, until the distal end 504 of the bolt 226 abuts against the locking end 238 defined by the notch 228, thereby fixedly mounting the stanchion 110 on section 202 of the conveyor frame 110.

Figure 6:
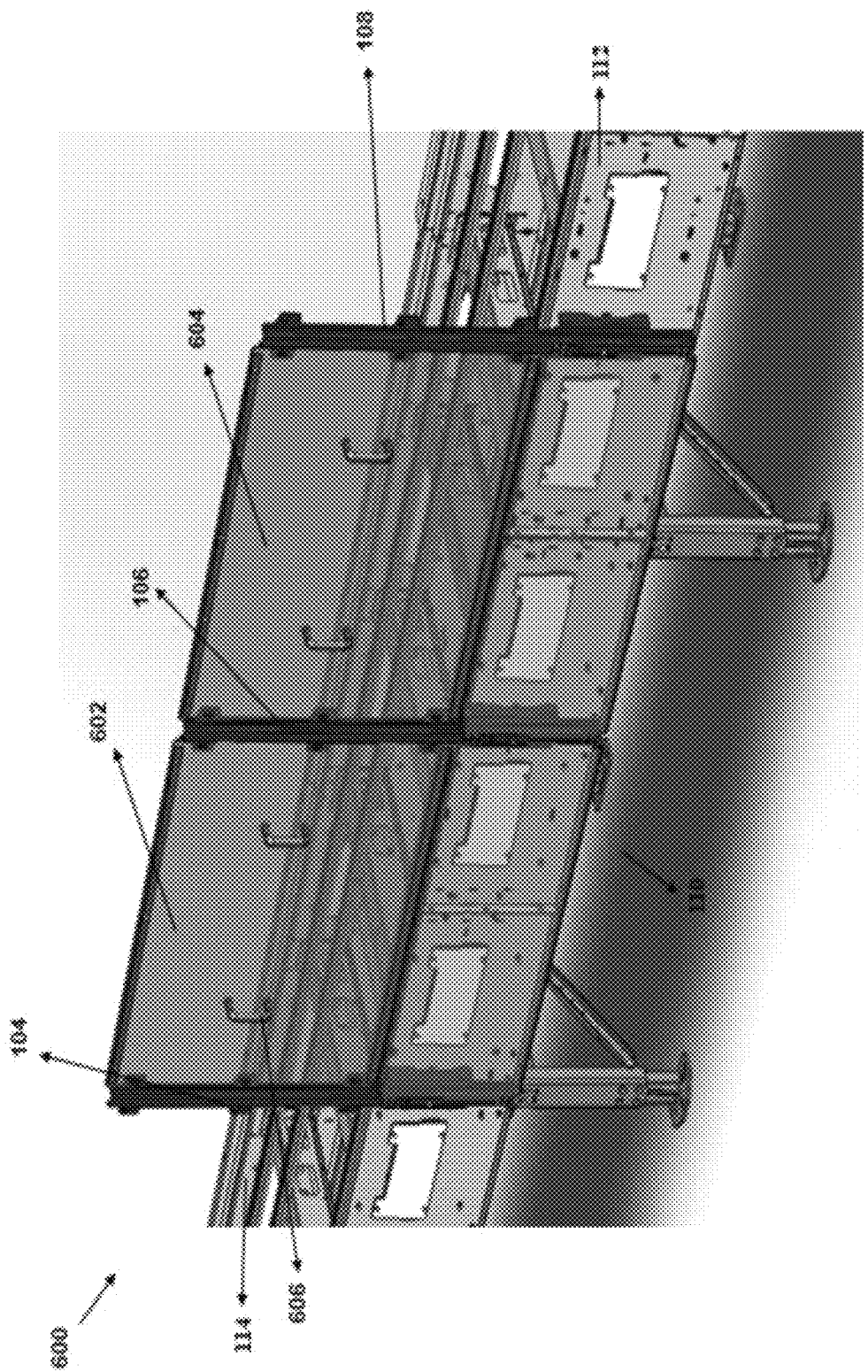
FIG. 6 is an example scenario illustrating a perspective view of safety panels mounted on stanchions of the conveyor, in accordance with some example embodiments described herein.

FIG. 6 illustrates a perspective view 600 of one or more equipment mounted on stanchions (104, 106, and 108) of the conveyor 102, in accordance with some example embodiments described herein. Illustratively, the conveyor 102 comprises, the first stanchion 104, the second stanchion 106, and the third stanchion 108 mounted on the conveyor frame 110 of the conveyor 102. The stanchions 104, 106, and 108 can be mounted on the conveyor frame 110 in a similar manner as described in FIGS. 4-5. Illustratively, a first safety guard panel 602 can be mounted on the conveyor 102 between the first stanchion 104 and the second stanchion 106 on the conveyor 102. Further, a second safety guard panel 604 can be mounted between the second stanchion 106 and the third stanchion 108 on the conveyor 102. In some examples, the first safety guard panel 602 and the second safety guard panel 604 can comprise one or more handles 606 that can be used for handling the safety guard panels 602 and 604 while the panels are mounted between two stanchions.

According to some example embodiments, each of the first stanchion 104, the second stanchion 106, and the third stanchion 108 can comprise one or more engagement slots (e.g. similar to the engagement slot 252 illustrated in FIG. 2) that can support mounting of the equipment on the conveyor 102. In this regard, according to some example embodiments, the first safety guard panel 602 and the second safety guard panel 604 can also comprise one or more slots that can be defined of a shape that compliments with a shape of the engagement slots (e.g. the engagement slot 252) of the stanchions 104, 106, and 108. To this end, in some examples, the safety guard panels 602 and 604 can be mounted between two stanchions using a nut and bolt-based engagement assembly. For instance, in some example embodiments, for mounting the safety guard panel 602 between the stanchions 104 and 106, one or more bolts may be passed through respective slots of the safety guard panel 602 and further through the respective engagement slots of the stanchions 104 and 106. Further, one or more nuts can be fastened over the respective bolts engaging the safety guard panel 602 between the stanchions 104 and 106.

Although not illustrated, however, in some example embodiments, the stanchions 104, 106, and 108 can be configured to support mounting of a divert path on the conveyor 102. The path referred herein corresponds to a conveyor path on which the items can be diverted from the conveyor 102 (e.g. a shoe sorter). In this regard, the engagement slots (e.g. the engagement slot 252) of the stanchions 104, 106, and 108 can be adapted to support mounting of the divert unit on the conveyor 103. Further, according to some example embodiments described herein, the stanchions 104, 106, and 108 can also support mounting of components like take-away spurs, safety guards, panels, covers, chutes, safety pullcord guides, and other equipment on the conveyor 102.

Figure 7:
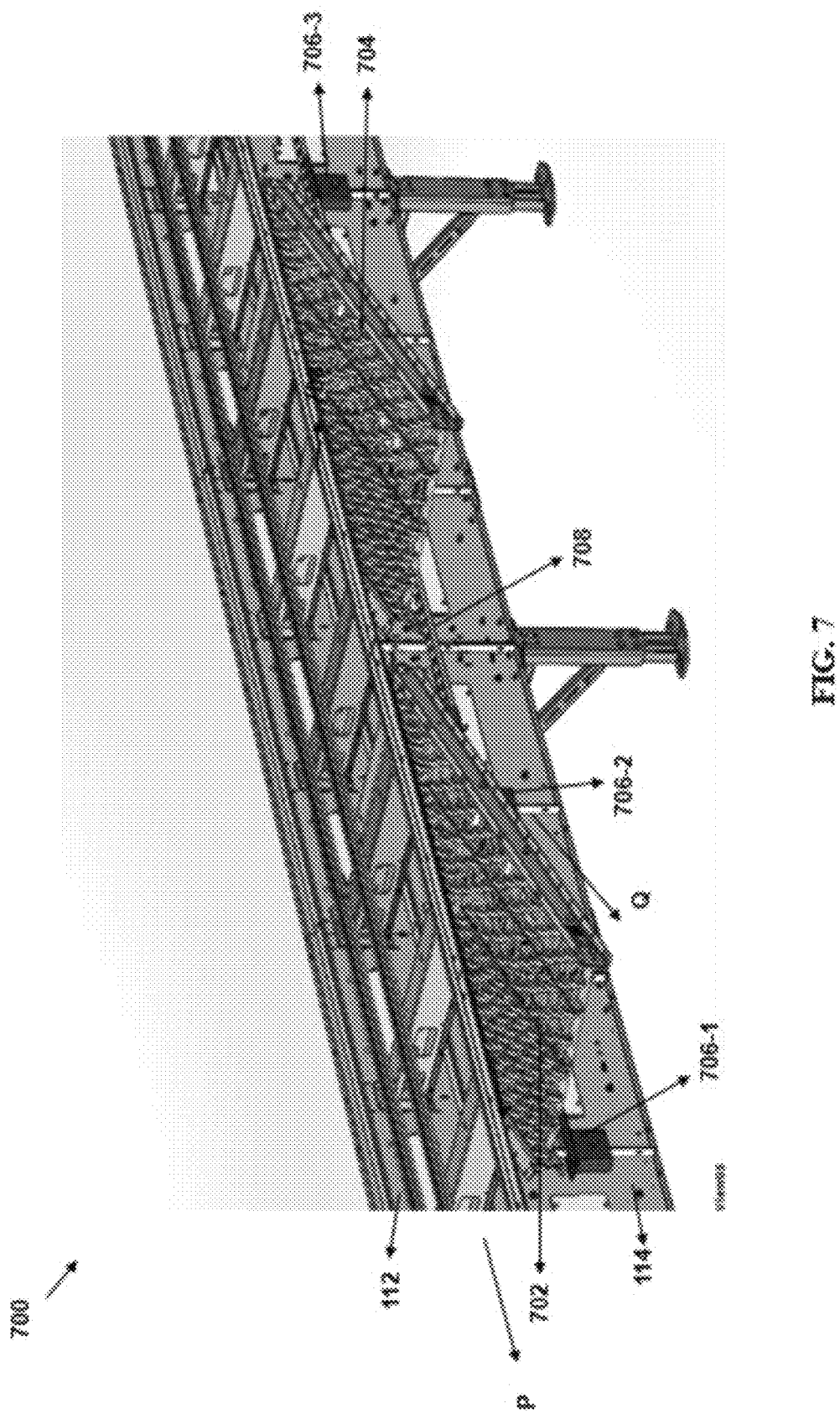
FIG. 7 is another example scenario illustrating a perspective view of take away spurs mounted on the conveyor using a plurality of stanchions of the conveyor, in accordance with some example embodiments described herein

FIG. 7 is another example scenario illustrating a perspective view 700 of take away spurs (702, 704) mounted on the conveyor 102 using a plurality of stanchions of the conveyor 102, in accordance with some example embodiments described herein. Illustratively, the conveyor 102 comprises the plurality of stanchions (706-1, 706-2, 706-3) that can be configured for mounting the take away spurs (702, 704) on the second side frame 114 of the conveyor 102. In this regard, the stanchions (706-1, 706-2, and 706-3) can support positioning of a mounting channel 708 on which a spur mounting rail (not shown) of the take away spurs (702, 704) can be mounted. Further details of mounting of the take away spurs (702, 704) are described in reference to FIG. 8. In accordance with some example embodiments, the take away spurs (702, 704) referred herein, can be configured to receive one or more articles that may be diverted (e.g. laterally) to move in a direction Q from a direction of conveyance P of the conveyor 102.

Figure 8:
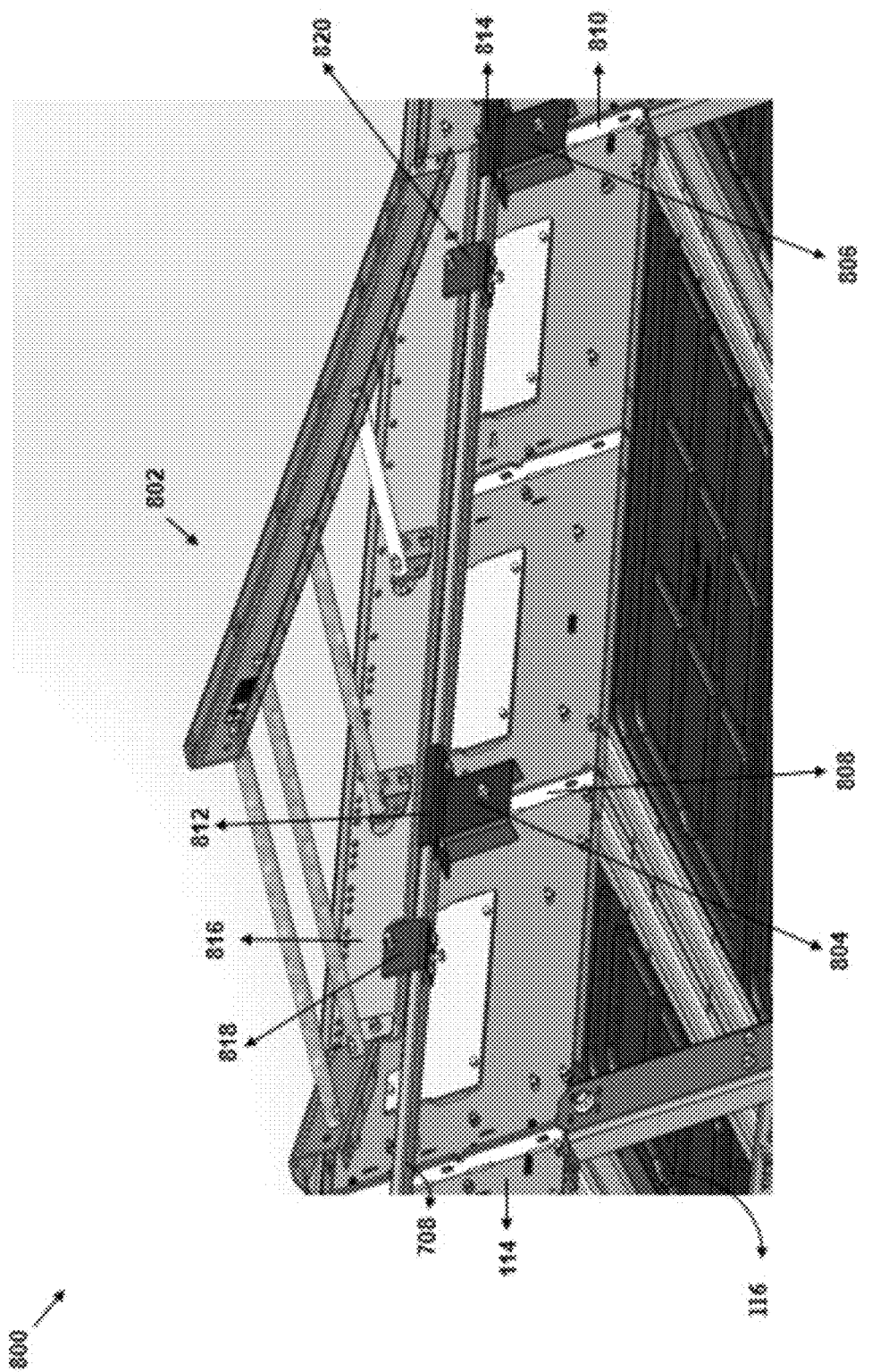
FIG. 8 is a perspective view of a take away spur mounted on the conveyor by a plurality of stanchions, in accordance with some example embodiments described herein.

FIG. 8 is a perspective view 800 of a take away spur 802 mounted on the conveyor 102 by a plurality of stanchions (804, 806), in accordance with some example embodiments described herein. As illustrated, the plurality of stanchions (804, 806) can be mounted on respective cross-bar members (808, 810) defined on the second side frame 114 of the conveyor 102. For instance, the stanchion 804 can be mounted on the cross-bar member 808 and the stanchion 806 can be mounted on the cross-bar member 810 (in a similar fashion as described with reference for stanchion 104 in FIGS. 2-5). Further, in some example embodiments, each of the stanchions 804, 806 can define a respective top member 812 and 814 that can be configured to receive the spur mouting channel 708. In this regard, in some example embodiments, upon positioning the mounting channel 708 on the top members 812, 814, the mounting channel 708 can be engaged with the top members 812, 814 using channel spring nuts and bolts (not shown), thereby fixing the spur mounting channel 708 on the stanchions (804, 806). Further, in some example embodiments, a spur mounting rail 816 of the take away spur 802 can be mounted on the mounting channel 708 using spur mounting clips 818, 820. Details of the spur mounting rail 816, the spur mounting clips 818, 820, and the spur mounting channel 708 are described in reference to FIGS. 9-10.

Figure 9:
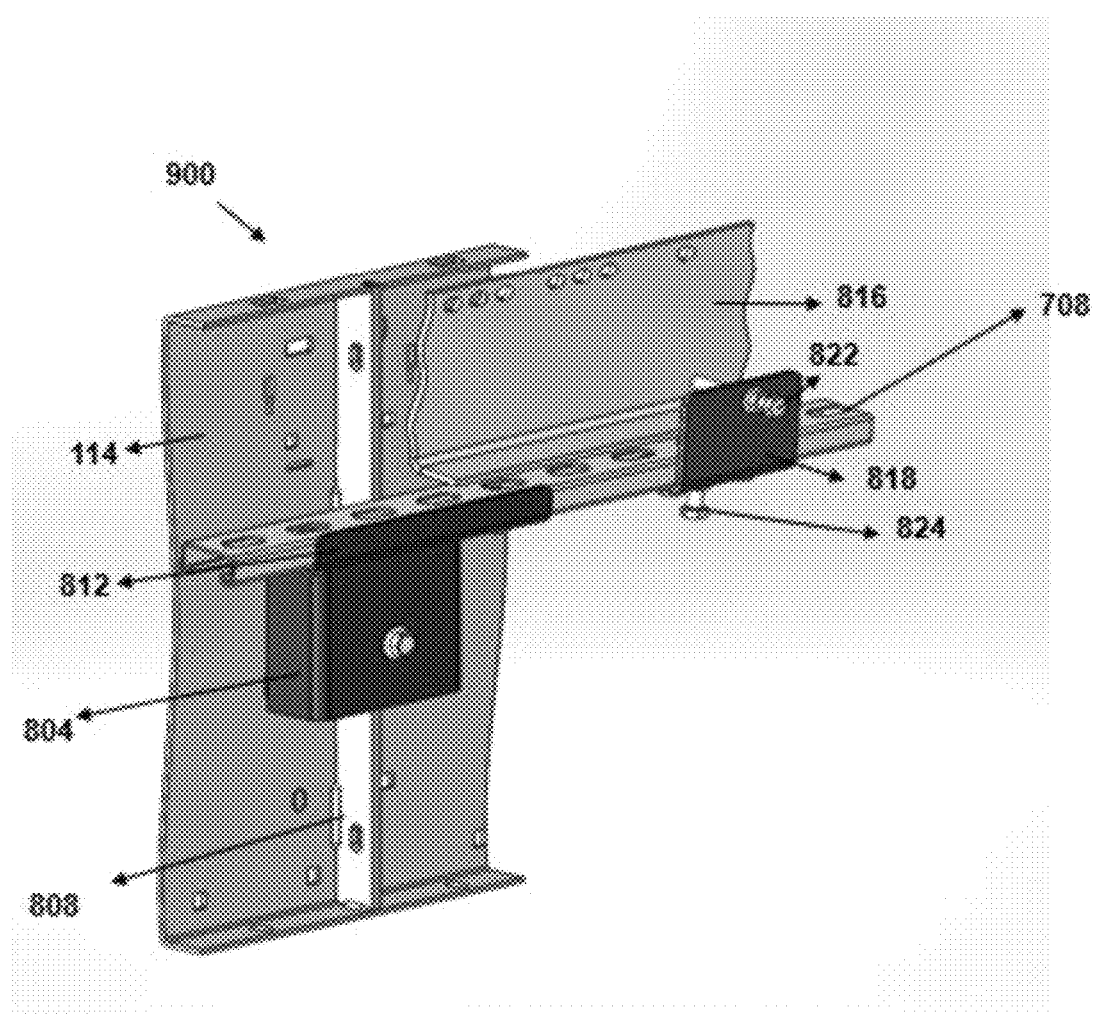
FIG. 9 illustrates a perspective view of a portion of the conveyor representing mounting of a spur mounting rail of the take away spur on a side frame of the conveyor, in accordance with some example embodiments described herein.
Figure 10:
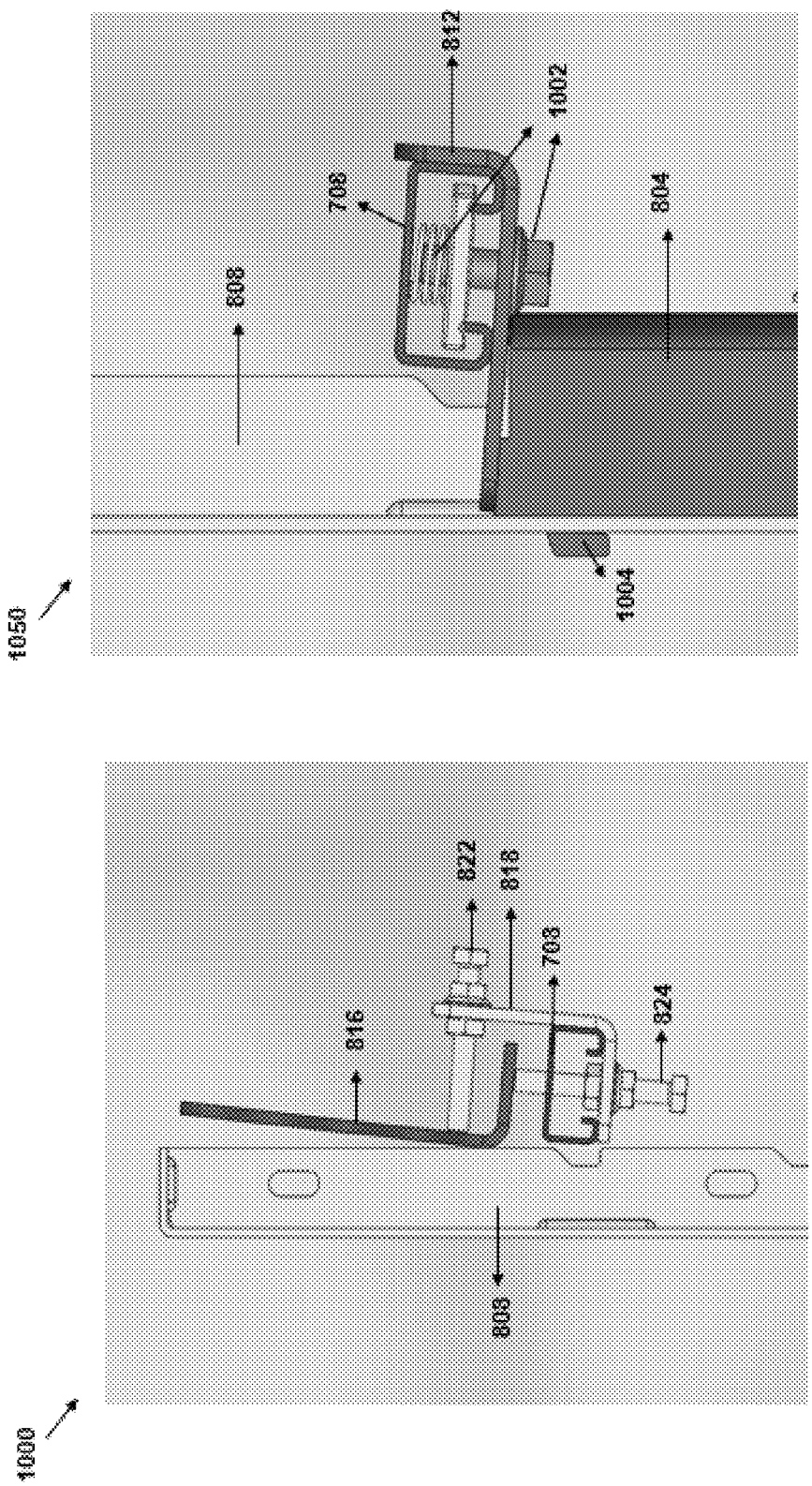
FIG. 10 illustrates a side view representing mounting of the spur mounting rail on a stanchion of the conveyor and an end view representing mounting of a spur mounting channel on a top member defined by the stanchion, in accordance with some example embodiments described herein.

FIG. 9 illustrates a perspective view 900 of a portion of the conveyor 102 representing mounting of the spur mounting rail 816 on the second side frame 114 of the conveyor 102. Illustratively, the top member 812 defined by the stanchion 808 can receive the spur mounting channel 708. In this regard, in some example embodiments, the spur mounting channel 708 can be mounted with the stanchion 804 using channel spring nuts and hex bolts (not shown). Mounting of the spur mounting channel 708 on the top member 812 defined by the stanchion 808 is illustrated in FIG. 10. In accordance with some example embodiments, a frame of the take away spur 802 can comprise the spur mounting rail 816. In this regard, as illustrated, the spur mounting rail 816 of the take away spur 802 can be positioned over the spur mounting channel 708. Further, in some example embodiments, upon positioning the spur mounting rail 816 on the spur mounting channel 708, the spur mounting clip 818 can be positioned against the spur mounting channel 708 and fastened using channel nuts (822, 824) and hex bolts, thereby fixing the spur mounting clip 818 on the spur mounting channel 708 and the spur mounting rail 816 between the spur mounting clip 818 and the second side rail 114. Further details of mounting of the spur mounting clip 818 on the spur mounting channel 708 are described in reference with FIG. 10.

FIG. 10 illustrates a side view 1000 representing mounting of the spur mounting rail 816 between the cross-member bar 808 (e.g. defined by the second side rail 114 described in FIG. 1) and the spur mounting clip 818, in accordance with some example embodiments described herein. FIG. 10 also illustrates an end view 1050 representing mounting of the spur mounting channel 708 on the top member 812 defined by the stanchion 804, in accordance with some example embodiments described herein.

Referring to the side view 1000, the spur mounting channel 708 is positioned on the top member 812 defined by the stanchion 804 and supports the spur mounting rail 816. In this regard, in some example embodiments, the spur mounting rail 816 can be fixedly mounted between the spur mounting clip 818 and the cross-bar member 808 defined by the second side rail 114 based on fastening by the channel bolts (822, 824) and hex bolts. In some example embodiments, an angle at which the take away spur 802 can be mounted relative to the second side frame 114 of the conveyor 102, can be adjusted based on fastening of one or more lock nuts over the channel bolts (822, 824).

Referring to the end view 1050, the spur mounting channel 708 can be mounted on the top member 812 defined by the stanchion 804 using channel spring nut 1002. Illustratively, the end view 1050 also illustrates an engagement of a hook 1004 of the stanchion 804 in a respective slot on the cross-bar member 808 of the second side frame 114 of the conveyor 102.

In some example embodiments, the stanchions (104, 106, 108, 706-1, 706-2, 706-3, 804, 806) as described in the description can be configured to support mounting of a pull cord of the conveyor 102. FIG. 11 is another example scenario illustrating a first view 1100 representing a pull cord 1102 mounted on the stanchions (104, 106, 108) of the conveyor 102 and a second view 1150 representing engagement of the pull cord 1102 on a hook 1104 mounted on a pull cord bracket defined by the stanchion 106, in accordance with some example embodiments described herein. In some example embodiments, the pull cord 1102 may be connected to a switch (not shown) that can be actuated by pulling the pull cord 1102 to stop an ongoing operation of the conveyor 102.

Thus, in accordance with various example embodiments, the stanchions (104, 106, 108, 706-1, 706-2, 706-3, 804, 806) can be mounted on the side frames of the conveyor 102 and can be further configured to mount a plurality of components (e.g., but not limited to, the take away spurs 704, 704 802, pull cord 1102, safety panels 602, 604) as described in various example embodiments herein. It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A conveyor comprising:
   a conveyor frame that comprises:
      a first slot defined on a first portion of the conveyor frame; and
      a notch defined on a second portion of the conveyor frame; and
   a stanchion configured to be mounted on the conveyor frame, the stanchion comprising:
      a first hook adapted to pass through the first slot of the conveyor frame; and
      a surface that defines an aperture, the aperture adapted to enable a bolt to pass through the stanchion and insert into the notch in the second portion of the conveyor frame,
      wherein the stanchion comprises:
         a first portion that defines the first hook;
         a second portion;
         a third portion defined between the first portion and the second portion and protruding out from a plane defined by the first portion and the second portion,
      wherein the third portion comprises the surface that defines the aperture.

2. The conveyor of claim 1, wherein the stanchion is fixedly mountable on the conveyor frame based on at least an engagement of the first hook of the stanchion with the first slot of the conveyor frame and fastening of the bolt through the stanchion engaged on the conveyor frame.

3. The conveyor of claim 1, wherein the second portion of the conveyor frame is a cross bar that extends across a side of the conveyor frame.

4. The conveyor of claim 2, wherein the bolt is fastened through the stanchion engaged to the conveyor frame so that a distal end of the bolt abuts against a locking end defined by the notch.

5. The conveyor frame of claim 1, wherein the conveyor frame further comprises a second slot, a third slot, and a fourth slot, and wherein
   the first portion further defines a second hook, the first hook and the second hook adapted to engage with the first slot and the second slot, respectively, of the conveyor frame; and
   the second portion defines a third hook and a fourth hook, the third hook and the fourth hook adapted to engage with the third slot and the fourth slot, respectively, of the conveyor frame.

6. The conveyor frame of claim 1, wherein the stanchion further comprises:
   an equipment mounting slot adapted to enable an engagement of a safety guard panel on the conveyor frame.

7. The conveyor frame of claim 1, wherein the stanchion further comprises:
   an equipment mounting slot adapted to enable an engagement of a divert unit of the conveyor on the conveyor frame.

8. A stanchion configured to be mounted on a conveyor frame of a conveyor, the stanchion comprising:
   a longitudinal post defined between a first end and a second end, the longitudinal post comprising:
      a first portion defining a first hook;
      a second portion defining a second hook; and
      a third portion defined between the first portion and the second portion so that the third portion protrudes out from a plane defined by the first portion and the second portion, wherein the third portion defines an aperture adapted to enable a bolt to pass through from the aperture and insert into a member of the conveyor frame, thereby, engaging the stanchion on the conveyor frame.

9. The stanchion of claim 8, wherein a shape of the first hook and the second hook of the stanchion complements to a shape of a first slot and a second slot of the conveyor frame, thereby supporting an engagement of the first hook into the first slot and an engagement of the second hook into the second slot of the conveyor frame.

10. The stanchion of claim 8 further comprising, an equipment mounting slot adapted to enable an engagement of a safety guard panel on the conveyor frame.

11. The stanchion of claim 8 further comprising, an equipment mounting slot adapted to enable an engagement of a divert unit of the conveyor on the conveyor frame.

12. The stanchion of claim 8 is fixedly mountable on the conveyor frame based on at least: an engagement of the first hook into a first slot of the conveyor frame, an engagement of the second hook into a second slot of the conveyor frame and fastening of the bolt through the stanchion engaged on the conveyor frame.

13. The stanchion of claim 8, wherein, the bolt is fastened through the stanchion engaged to the conveyor frame so that a distal end of the bolt abuts against a locking end defined by the member of the conveyor frame.

14. A stanchion for mounting an equipment on a conveyor frame, comprising:
   a first portion comprising a first hook adapted to pass through a first slot of the conveyor frame, thereby engaging the stanchion on the conveyor frame, wherein the first portion defines the first hook and a second hook, the first hook and the second hook adapted to engage with the first slot and a second slot of the conveyor frame, respectively;
   a second portion defining a third hook and a fourth hook, the third hook and the fourth hook adapted to engage with a third slot and a fourth slot of the conveyor frame; and
   a protruded portion that defines an aperture adapted to enable a bolt to pass through the aperture and abut with a member of the conveyor frame, thereby fixedly mounting the stanchion with the conveyor frame, wherein the protruded portion is defined between the first portion and the second portion of the stanchion and wherein the protruded portion protrudes out relative to a plane defined by the first portion and the second portion of the stanchion.

15. The stanchion of claim 14, wherein at least one of the first portion and the second portion further defines, an equipment mounting slot adapted to enable an engagement of a safety guard panel on the conveyor frame.

16. The stanchion of claim 14 is fixedly mountable on the conveyor frame based on at least, an engagement of the first hook with the first slot of the conveyor frame and fastening of the bolt so that the bolt pass through the stanchion and abuts at a notch defined at the conveyor frame.

17. The stanchion of claim 14 further comprising, an equipment mounting slot adapted to enable an engagement of a divert unit of the conveyor on the conveyor frame.

18. A stanchion for mounting an equipment on a conveyor frame, comprising:
   a first portion comprising a first hook adapted to pass through a slot of the conveyor frame, thereby engaging the stanchion on the conveyor frame;
   a second portion; and
   a protruded portion that defines an aperture adapted to enable a bolt to pass through the aperture and abut with a member of the conveyor frame, thereby fixedly mounting the stanchion with the conveyor frame, wherein the protruded portion is defined between the first portion and the second portion of the stanchion and wherein the protruded portion protrudes out relative to a plane defined by the first portion and the second portion of the stanchion.

* * * * *